United States Patent
Avudaiyappan et al.

(10) Patent No.: US 11,853,717 B2
(45) Date of Patent: Dec. 26, 2023

(54) ACCELERATING PROCESSING BASED ON SPARSITY FOR NEURAL NETWORK HARDWARE PROCESSORS

(71) Applicant: Microsoft Technology Licensing, LLC, Redmond, WA (US)

(72) Inventors: Karthikeyan Avudaiyappan, Sunnyvale, CA (US); Jeffrey Andrews, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 387 days.

(21) Appl. No.: 17/149,606

(22) Filed: Jan. 14, 2021

(65) Prior Publication Data

US 2022/0222043 A1 Jul. 14, 2022

(51) Int. Cl.
  *G06F 7/544* (2006.01)
  *G06F 7/50* (2006.01)
  *G06F 7/523* (2006.01)
  *G06F 17/16* (2006.01)
  *G06N 3/063* (2023.01)

(52) U.S. Cl.
  CPC .............. *G06F 7/5443* (2013.01); *G06F 7/50* (2013.01); *G06F 7/523* (2013.01); *G06F 17/16* (2013.01); *G06N 3/063* (2013.01)

(58) Field of Classification Search
  CPC .......... G06F 7/50; G06F 7/523; G06F 7/5443; G06F 17/16; G06N 3/063
  See application file for complete search history.

(56) References Cited

U.S. PATENT DOCUMENTS

| | | | |
|---|---|---|---|
| 9,529,590 | B2 | 12/2016 | Song |
| 11,604,973 | B1* | 3/2023 | Sather ..................... G06F 17/16 |
| 2012/0113133 | A1* | 5/2012 | Shpigelblat ......... G06F 9/30141 |
| | | | 708/607 |
| 2014/0108481 | A1 | 4/2014 | Davis et al. |
| 2018/0046900 | A1 | 2/2018 | Dally et al. |
| 2018/0046906 | A1 | 2/2018 | Dally et al. |
| 2018/0121377 | A1* | 5/2018 | Woo ....................... G06N 3/063 |

(Continued)

OTHER PUBLICATIONS

C. Kim et al., Mosaic-CNN: A Combined Two-Step Zero Prediction Approach to Trade off Accuracy and Computation Energy in Convolutional Neural Networks, IEEE Journal on Emerging and Selected Topics in Circuits and Systems, vol. 8, No. 4, 2018 (Year: 2018).*

(Continued)

*Primary Examiner* — Emily E Larocque
(74) *Attorney, Agent, or Firm* — Fountainhead Law Group PC

(57) ABSTRACT

Embodiments of the present disclosure include systems and methods for accelerating processing based on sparsity for neural network hardware processors. An input manager determines a pair of non-zero values from a pair of data streams in a plurality of pairs of data streams and retrieve the pair of non-zero values from the pair of data streams. A multiplier performs a multiplication operation on the pair of non-zero values and generate a product of the pair of non-zero values. An accumulator manager receives the product of the pair of non-zero values from the multiplier and sends the product of the pair of non-zero values to a corresponding accumulator in a plurality of accumulators.

20 Claims, 16 Drawing Sheets

(56) References Cited

U.S. PATENT DOCUMENTS

2019/0205358 A1  7/2019  Diril et al.
2019/0325314 A1  10/2019  Bourges-Sevenier et al.
2020/0051203 A1  2/2020  Nurvitadhi et al.

OTHER PUBLICATIONS

Han, Song, "Efficient Methods and Hardware for Deep Learning", In Thesis of Graduate Studies of Stanford University, Sep. 2017, 125 Pages.

Parashar, et al., "SCNN: An Accelerator for Compressed-sparse Convolutional Neural Networks", In Journal of Computing Research Repository, Aug. 2017, 12 pages.

Shi, et al., "Speeding up Convolutional Neural Networks by Exploiting the Sparsity of Rectifier Units", In Journal of Computing Research Repository, Apr. 2017, 7 Pages.

Gondimalla, et al., "SparTen: A Sparse Tensor Accelerator for Convolutional Neural Networks", In Proceedings of the 52nd Annual IEEE/ACM International Symposium on Microarchitecture, Oct. 12, 2019, pp. 151-165.

"International Search Report & Written Opinion issued in PCT Application No. PCT/US21/062719", dated Mar. 18, 2022, 11 Pages.

* cited by examiner

| Element | Value |
|---|---|
| A0 | 0 |
| A1 | 7 |
| A2 | 78 |
| A3 | 0 |
| A4 | 5 |
| A5 | 0 |
| A6 | 0 |
| A7 | 0 |
| B0 | 3 |
| B1 | 0 |
| B2 | 13 |
| B3 | 31 |
| B4 | 0 |
| B5 | 80 |
| B6 | 4 |
| B7 | 0 |

| Operation | Execution Cycle |
|---|---|
| O0 = A0 * B0 + O0 | 1 |
| O1 = A4 * B0 + O1 | 2 |
| O2 = A0 * B4 + O2 | 3 |
| O3 = A4 * B4 + O3 | 4 |
| O0 = A1 * B1 + O0 | 5 |
| O1 = A5 * B1 + O1 | 6 |
| O2 = A1 * B5 + O2 | 7 |
| O3 = A5 * B5 + O3 | 8 |
| O0 = A2 * B2 + O0 | 9 |
| O1 = A6 * B2 + O1 | 10 |
| O2 = A2 * B6 + O2 | 11 |
| O3 = A6 * B6 + O3 | 12 |
| O0 = A3 * B3 + O0 | 13 |
| O1 = A7 * B3 + O1 | 14 |
| O2 = A3 * B7 + O2 | 15 |
| O3 = A7 * B7 + O3 | 16 |

FIG. 2D

| Operation | Execution Cycle |
|---|---|
| O1 = A4 * B0 + O1 | 1 |
| O2 = A1 * B5 + O2 | 2 |
| O0 = A2 * B2 + O0 | 3 |
| O2 = A2 * B6 + O2 | 4 |

FIG. 2K

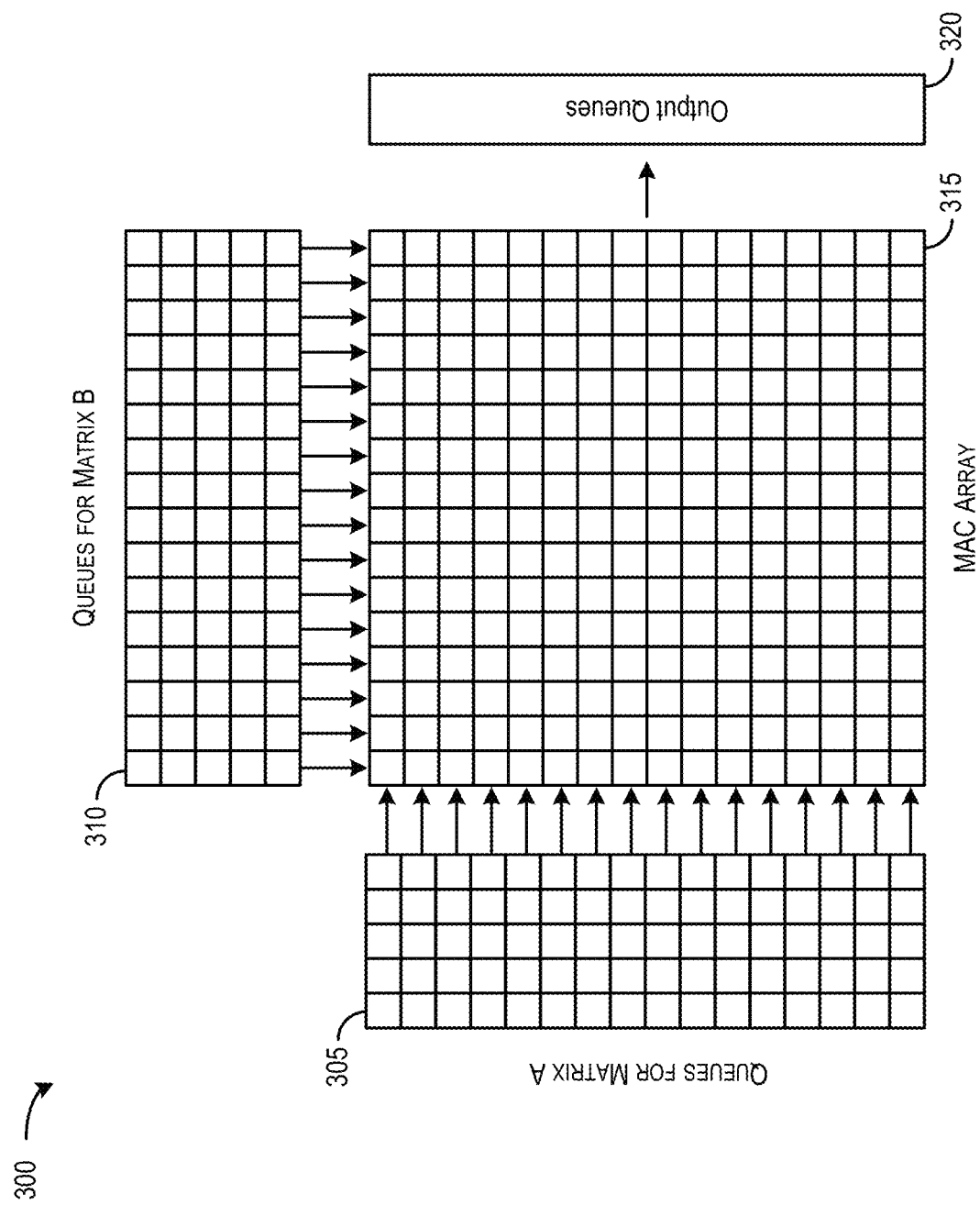

ACCELERATING PROCESSING BASED ON SPARSITY FOR NEURAL NETWORK HARDWARE PROCESSORS

BACKGROUND

The present disclosure relates to computing hardware. More particularly, the present disclosure relates to techniques for training and using neural networks to perform inference.

A neural network is a machine learning model used for a variety of different applications (e.g., image classification, computer vision, natural language processing, speech recognition, writing recognition, etc.). A neural network may be trained for a set of purposes by running datasets through it, comparing results from the neural network to known results, and updating the network parameters based on the differences.

BRIEF DESCRIPTION OF THE DRAWINGS

Various embodiments of the present disclosure are illustrated by way of example and not limitation in the figures of the accompanying drawings.

FIGS. 2A-2K illustrate an example of accelerating processing based on sparsity using the hardware system illustrated in FIG. 1 according to some embodiments.

FIG. 3 illustrates an example hardware system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for accelerating processing based on sparsity for neural network hardware processors. In some embodiments, a system includes a multiplier that is coupled to several accumulators. The system is configured to receive several pairs of data streams. Each accumulator is configured to perform accumulation operations on one pair of data streams. Using the multiplier, the system is able to perform a multiplication operation in one execution cycle. The system may perform an accumulation operation in one execution cycle. Thus, to perform a multiplication operation in a given input and then process the product of the multiplication operation through an accumulator takes two execution cycles. When processing a given set of data in the pairs of data streams, the system iteratively examines pairs of data from each pair of data streams to determine whether multiplication operations can be skipped. For example, if a pair of data from a particular pair of data streams has at least one zero value, the system can skip that multiplication and accumulation operations and move on to examine the pair of data from the next pair of data streams. If a pair of data from a particular pair of data streams are both non-zero values, the system performs a multiplication and accumulation operation on them.

The techniques described in the present application provide a number of benefits and advantages over conventional methods of processing using neural network hardware processors. For instance, skipping the performing of operations on pairs of data that have at least one zero value and performing operations on pairs of data that are both non-zero values increases the speed at which the pairs of data can be processed. Traditional methods of processing such data perform operations on every pair of data. In addition, using hardware that includes a multiplier and several accumulators for several pairs of data streams improves the efficiency of the processing in situations where operations on pairs of data take multiple cycles to complete. The efficiency of conventional hardware processors that may employ one multiplier and one accumulator is limited by the number of cycles it takes to perform operations on the pairs of data.

Figure 1:
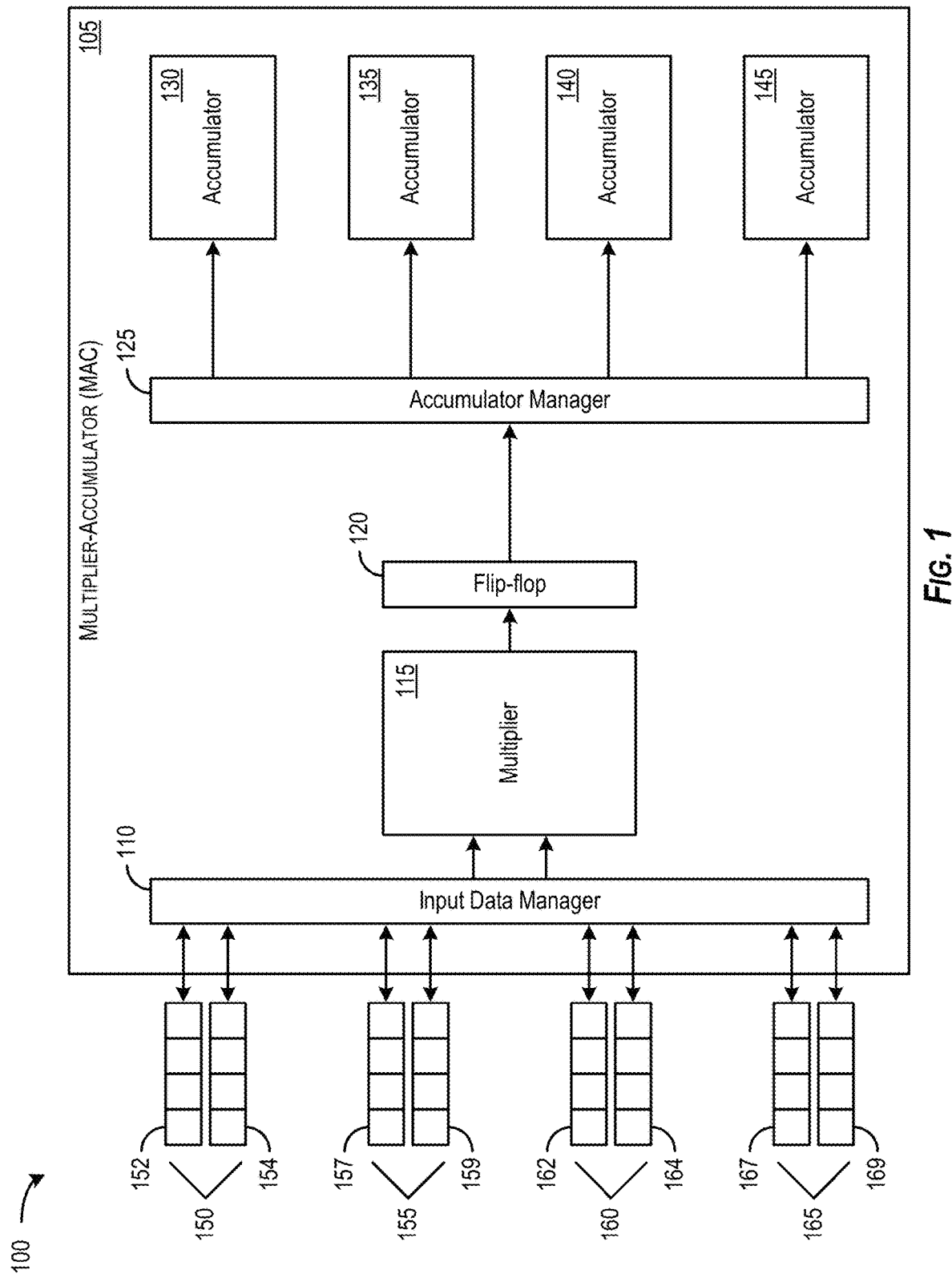
FIG. 1 illustrates a hardware system according to some embodiments.

FIG. 1 illustrates a hardware system 100 according to some embodiments. As shown, hardware system 100 includes multiplier-accumulator (MAC) 105 and pairs of data streams 150-165. Each of the pairs of data streams 150-165 includes two data streams. Specifically, pair of data stream 150 includes data streams 152 and 154, pair of data stream 155 includes data streams 157 and 159, pair of data streams 160 includes data streams 162 and 164, and pair of data streams 165 includes data streams 167 and 169. In some embodiments, each of the pairs of data streams 150-165 are implemented by a queue (e.g., a first in first out (FIFO) queue) that is configured to receive or read data from a data source (not shown).

As illustrated in FIG. 1, MAC 105 includes input data manager 110, multiplier 115, flip-flop 120, accumulator manager 125, and accumulators 130-145. Input data manager 110 is configured to manage input data that is to be processed through system 100. As illustrated in FIG. 1, in this example, input manager 110 is configured to manage four pairs of data streams 150-165. In some embodiments, input data manager 110 may determine a pair of data from a particular pair of data streams to process through system 100. For example, input data manager 110 can examine a pair of data from pair of data stream 150. If the pair of data are both non-zero values, input data manager 110 sends the pair of data to multiplier 115 for processing and iterates to pair of data streams 155. If the pair of data has at least one zero value, input data manager 110 drops the pair of data and (e.g., does not send the pair of data to multiplier 115) iterates to pair of data streams 155. At pair of data streams 155, input data manager 110 examiners a pair of data from it and performs the same operations as that performed for pair of data streams 150. Input data manager 160 repeats this process while iterating to pair of data streams 160, to pair of data streams 165, back to pair of data streams 150, etc.

Multiplier 115 is responsible for performing multiplication operations. For instance, when multiplier 115 receives two operands from input data manager 110, multiplier 110 multiplies the two operands together to generate a product and outputs the product to flip-flop 120. Flip-flop 120 is configured to store and output data. For example, flip-flop 120 may receive data from multiplier 115 during an execution cycle. At the end of the execution cycle, flip-flop 120 stores whatever value that flip-flop 120 is receiving from multiplier 115. That is, the value that flip-flop 120 receives from multiplier 115 may change at various times during the execution cycle, but flip-flop 120 only stores the value that it is receiving from multiplier 115 at the end of the execution cycle. At the beginning of an execution cycle, flip-flop 120 sends its stored value to accumulator manager 125. At the end of the execution cycle, flip-flop stops sending the stored value and stores the value that it is receiving from multiplier 115.

Accumulators 130-145 are each configured to perform accumulation operations on data from one of the pair of data streams 150-165. For this example, accumulator 130 is configured to perform accumulation operations for data from pair of data streams 150, accumulator 135 is configured to perform accumulation operations for data from pair of data streams 155, accumulator 140 is configured to perform accumulation operations for data from pair of data streams 160, and accumulator 145 is configured to perform accumulation operations for data from pair of data streams 165. Each of the accumulators 130-145 is configured to store a value. When each accumulator 130-145 receives a value from accumulator manager 125, it adds the received value to its stored value to produce a sum and updates its stored value with the sum.

Accumulator manager 125 is configured to route data from flip-flop 120 to accumulators 130-145. For instance, accumulator manager 125 can receive a value from flip-flop 120, which is a product calculated from a pair of data from one of the pairs of data streams 150-165. Accumulator manager 125 sends the received value to a corresponding accumulator (e.g., one of the accumulators 130-145). For example, if the value is a product calculated from data from pair of data streams 160, accumulator manager 125 sends the value to accumulator 140. Similarly, if the value is a product calculated from data from pair of data streams 150, accumulator 125 sends the value to accumulator 130. Accumulator manager routes products calculated from data from pair of data streams 155 to accumulator 135 and routes products calculated from data from pair of data streams 165 to accumulator 145.

In this example, MAC 105 is configured to perform a multiplication operation and an accumulation operation on a particular pair of data across two execution cycles. Specifically, during a first execution cycle, a multiplication operation is performed on two operands determined by input data manager 110. The product is stored in flip-flop 120 at the end of the first execution cycle. In a second execution cycle, flip-flop 120 sends the product to accumulator manager 125, which routes the product to one of the accumulators 130-145. The corresponding accumulator performs an accumulation operation on the product (e.g., adds its stored value with the product and updates its stored value with the calculated sum).

Figure 2A:
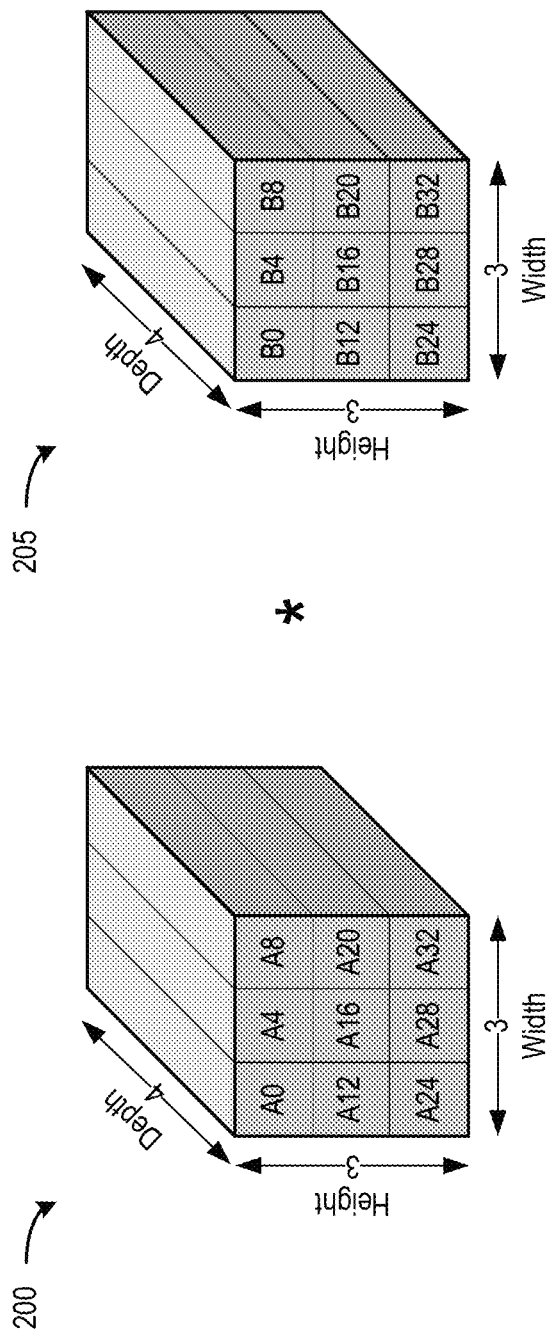

FIGS. 2A-2K illustrate an example of accelerating processing based on sparsity using hardware system 100 according to some embodiments. FIG. 2A illustrates two matrices 200 and 205 that will be used for this example. As shown in FIG. 2A, matrix 200 is a three-dimensional (3D) matrix with a height of 3 (e.g., 3 rows), a width of 3 (e.g., 3 columns), and a depth of 4 (e.g., 4 layers). A position at an intersection between the height and width axes may be referred to as a spatial position. The axis along the depth may be referred to as the channel axis.

For this example, matrix 200 is configured to store 3 elements along the height axis, 3 elements along the width axis, and 4 elements along the depth axis. The top row of matrix 200 will be referred to as the first row and the bottom row of matrix 200 will be referred to as the last row. Similarly, the left-most column of matrix 200 will be referred to as the first column and the right-most column of matrix 200 will be referred to as the last column. The layer at the front of matrix 200 will be referred to as the first layer and the layer at the back of matrix 200 will be referred to as the last layer. At the first row and first column of matrix 200, the first element in the first layer is referred to as A0, the first element in the second layer is referred to as A1, the first element in the third layer is referred to as A2, and the first element in the fourth layer is referred to as A3. As shown, at the first row and second column of matrix 200, the second element in the first layer is referred to as A4. The second element in the second layer is referred to as A5, the second element in the third layer is referred to as A6, and the second element in the fourth layer is referred to as A7. Other elements in matrix 200 are referred to in a similar manner.

Matrix 205 is similar to matrix 200 in that it is also a 3D matrix with a height of 3 (e.g., 3 rows), a width of 3 (e.g., 3 columns), and a depth of 4 (e.g., 4 layers). Additionally, matrix 205 is configured to store 3 elements along the height axis, 3 elements along the width axis, and 4 elements along the depth axis. Elements in matrix 205 are referred to in the same manner as matrix 200 except the elements in matrix 205 are labeled as B0, B1, B2, etc.

Figure 2B:
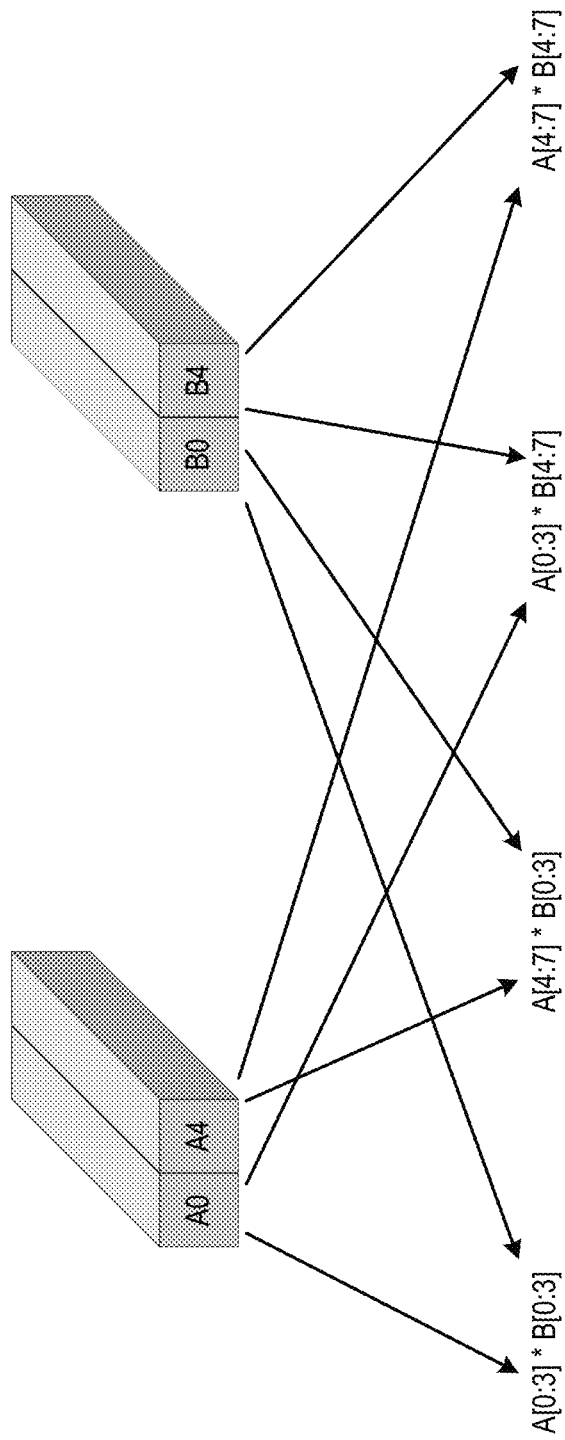

In this example, a matrix multiplication operation is performed between matrices 200 and 205. Over the course of a multiplication operation between two matrices, each set of elements in the spatial dimension in the first matrix will be multiplied by each set of elements in the spatial dimension in the second matrix. Therefore, a matrix multiplication operation can be performed through an all-to-all dot product multiplication operation between sets of elements in the spatial dimension in the two matrices. The all-to-all dot product multiplication approach is used for this example. FIG. 2B illustrates an example all-to-all dot product multiplication between two sets of elements in matrix 200 (the set of elements A0-A3 and the set of elements A4-A7 in this example) and two sets of elements in matrix 205 (the set of elements B0-B3 and the set of elements B4-B7 in this example). As shown, the all-to-all dot product multiplication between these sets of elements in matrices 200 and 205 is a first dot product multiplication between elements A0-A3 and elements B0-B3, a second dot product multiplication between elements A4-A7 and elements B0-B3, a third dot product multiplication between elements A0-A3 and elements B4-B7, and a fourth dot product multiplication between elements A4-A7 and elements B4-B7. For each convolution, the elements in matrix 200 are multiplied by the corresponding elements in matrix 205 and then the products are added together to create a final dot product. For example, in the first dot product multiplication, element A0 is multiplied by element B0, element A1 is multiplied by element B1, element A2 is multiplied by element B2, and element A3 is multiplied by element B3. The products of these multiplications are added to produce a final dot product, which is the output for the first dot product multiplication.

Figure 2C:

FIG. 2C illustrates a table 210 of example values for elements in matrices 200 and 205 for this example. As depicted, element A0 has a value of 0, elements A1 has a value of 7, element A2 has a value of 78, element A3 has a value of 0, element A4 has a value of 5, elements A5-A7 each have a value of 0, element B0 has a value of 3, element B1 has a value of 0, element B2 has a value of 13, element B3 has a value of 31, element B4 has a value of 0, element B5 has a value of 80, element B6 has a value of 4, and element B7 has a value of 0.

FIG. 2D illustrates a table 215 of operations and corresponding execution cycles. In particular, table 215 shows operations 220-295 for the four dot product multiplications mentioned above and the execution cycles in which operation 220-295 would start. For instance, operation 220 would start in execution cycle 1, operation 225 would start in execution cycle 2, operation 230 would start in execution cycle 3, etc. As mentioned above, hardware system 100 is being used to process the data in this example. In addition, MAC 105 is configured to perform a multiplication operation and an accumulation operation on a particular pair of data across two execution cycles. As such, operation 220 would start by multiplying elements A0 and B0 in the execution cycle 1. In execution cycle 2, an accumulation operation would be performed on the product calculated in operation 220. Also in execution cycle 2, operation 225 would start by multiplying elements A4 and B0. This is possible because the pair of data for operation 225 comes from a different pair of data streams. Operations 230-295 would be executed in this manner by interleaving pairs of data from different pairs of data streams into MAC 105. However, performing each of the operations 220-295 would be inefficient because many of the pairs of data being multiplied include a zero value and, thus, can be skipped.

Figure 2E:
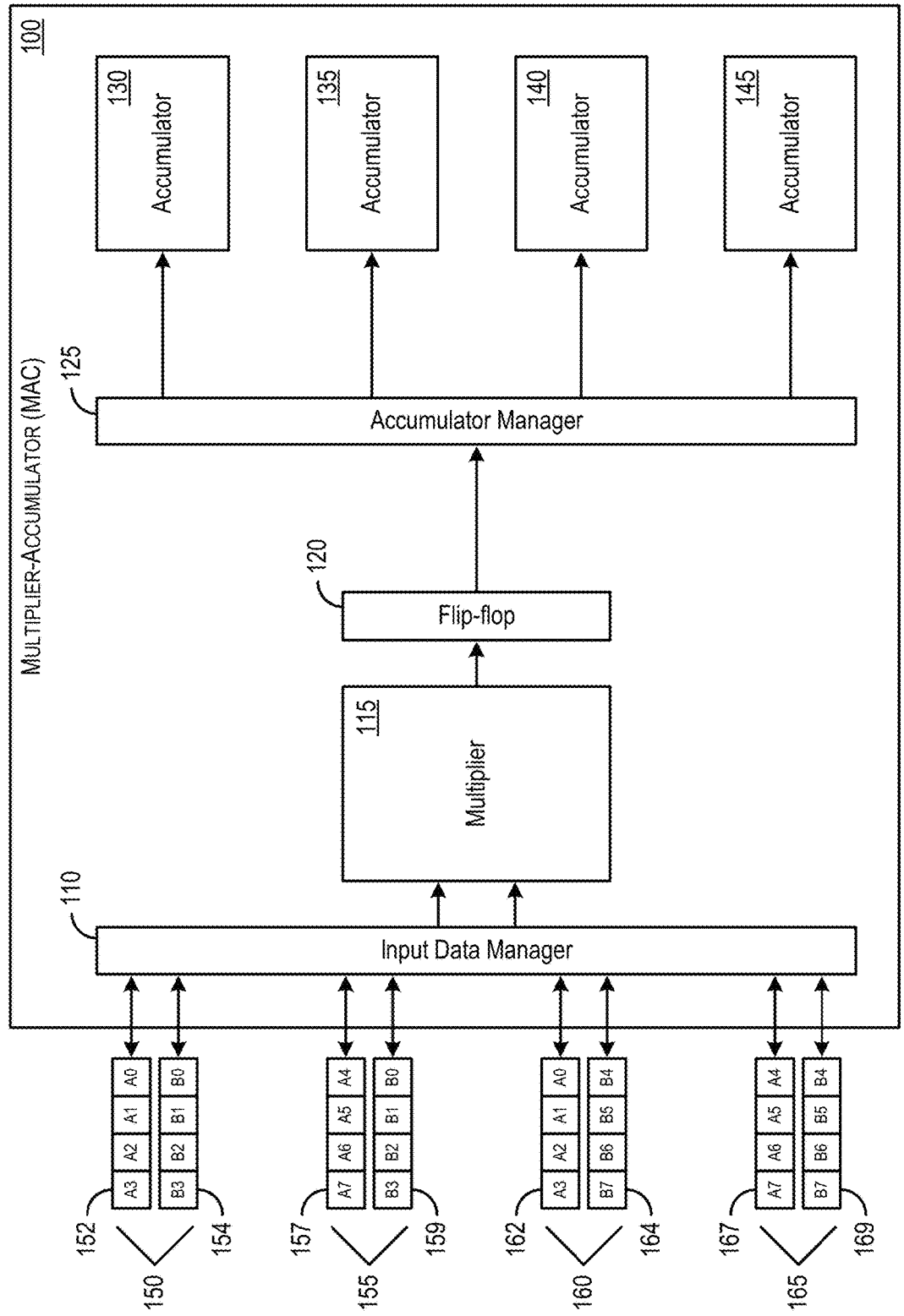

FIGS. 2E-2J illustrate an example of accelerating the processing of operations 220-295 based on the sparsity of the data. FIG. 2E illustrates the first execution cycle 1 for processing operations 220-295. In execution cycle 1, elements from matrices 200 and 205 are read into queues implementing pairs of data streams 150-165. Also, accumulators 130-145 are initialized to store a value of zero. Next, input data manager 110 determines a pair of data from one of the pair of data streams 150-165 where both values are non-zero. Based on the example values in table 210, the pair of data at the beginning of the queue of pair of data stream 150 (elements A0 and B0 in this example) are both zeros. Hence, input data manager 110 removes the pair of data from pair of data stream 150 and iterates to pair of data stream 155 to examine the pair of data at the beginning of the queue (elements A4 and B0 in this example). Since this pair of data includes two non-zero values, input data manager 110 determines that the pair of data is to be processed through MAC 105.

Figure 2F:
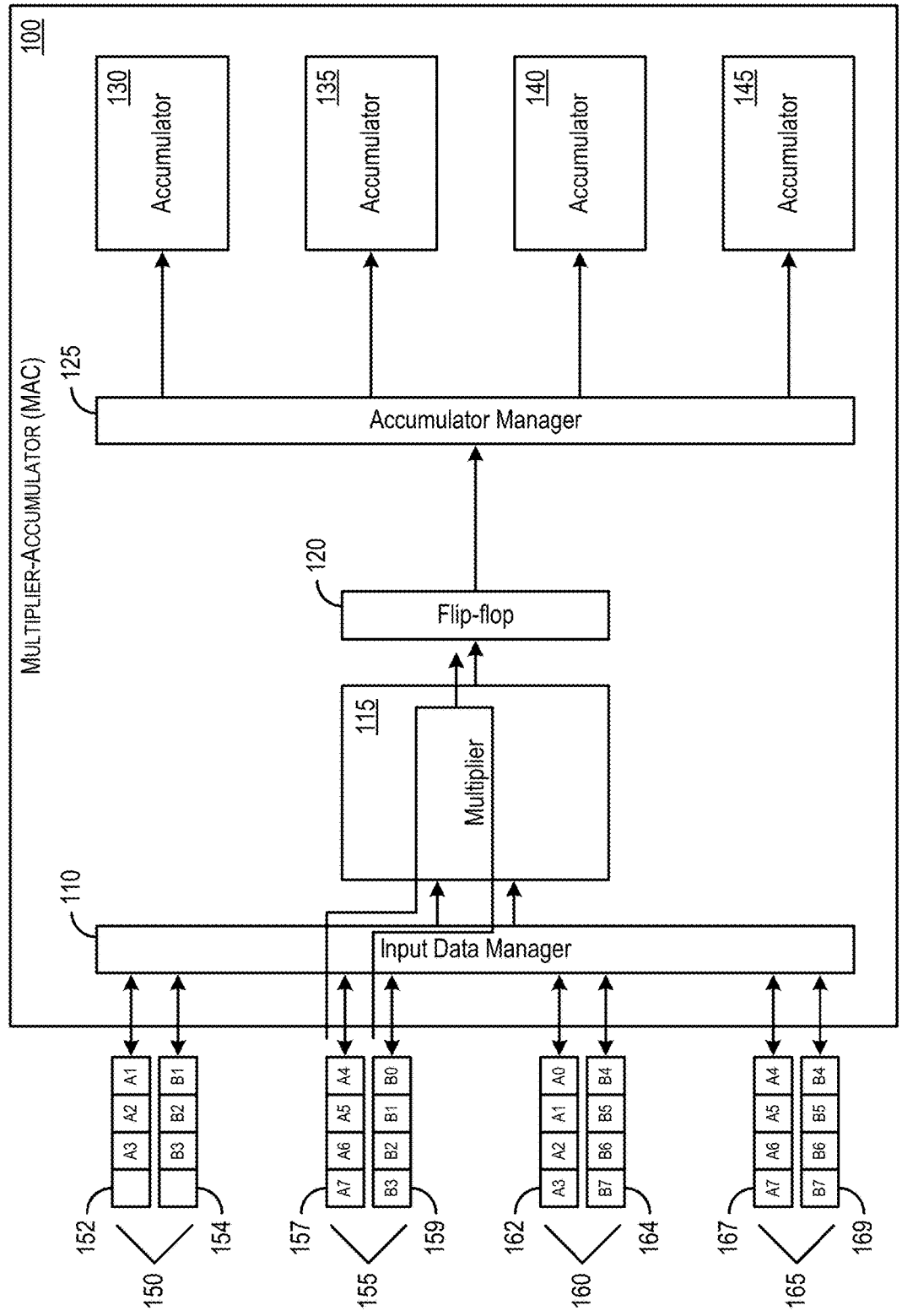

FIG. 2F illustrates the processing of the determined pair of data during execution cycle 1. As shown, once input data manager 110 determined that the pair of data is to be processed, input data manager 110 removes the pair of data from the queue for pair of data streams 155 and it sends it to multiplier 115. Multiplier 115 performs a multiplication operation on elements A4 and B0 to produce a product and sends the product to flip-flop 120, as indicated in FIG. 2F. At the end of execution cycle 1, flip-flop 120 stores the product of elements A4 and B0.

Figure 2G:
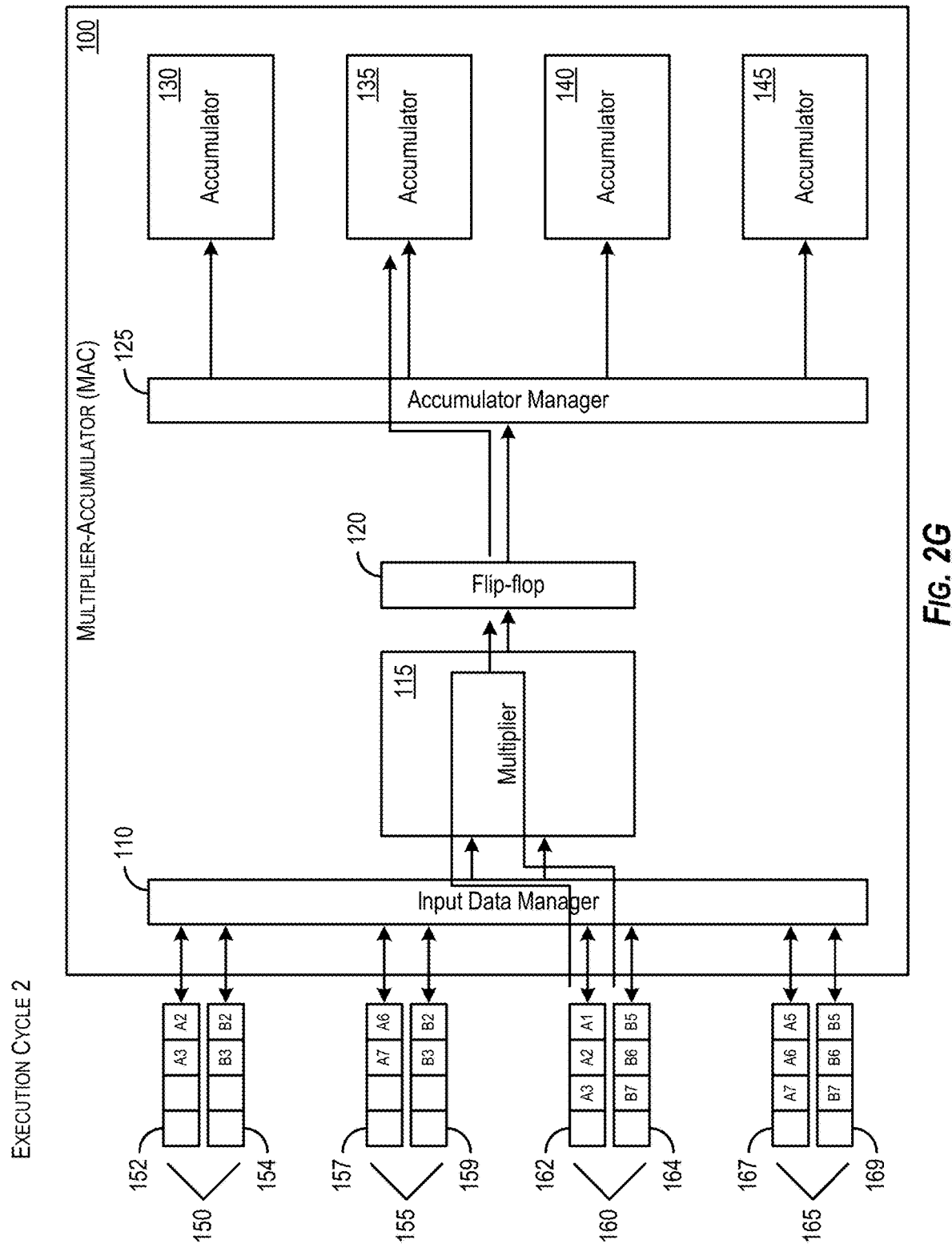

FIG. 2G illustrates the second execution cycle 2 for processing operations 220-295. For this example, input data manager 110 has continued to iterate through pairs of data streams 150-165 (e.g., starting by looking at elements A0 and B4 in pair of data streams 160) to identify a pair of values that are both non-zero. For pairs of data that includes at least one zero value, input data manager 110 removed them from the queue of the respective pair of data stream. Input data manager 110 did not find such a pair of values until it reached elements A1 and B5 in pair of data streams 160. As shown, upon finding this pair of data, input data manager 110 removes the pair of data from the queue for pair of data stream 160 and sends it to multiplier 115. Next, multiplier 115 performs a multiplication operation on elements A1 and B5 to produce a product. Then, multiplier 115 sends the product to flip-flop 120, as illustrated in FIG. 2G. At the end of execution cycle 2, flip-flop 120 stores the product of elements A1 and B5. During execution cycle 2, flip-flop 120 also sends the product from the multiplication operation in execution cycle 1 to accumulator manager 125. As the operands for the multiplication operation in execution cycle 1 was from pair of data stream 155, accumulator manager 125 routes the product to accumulator 135, which handles the accumulation of data for pair of data stream 155. Accumulator 135 adds the product to its stored value (zero in this example) to produce a sum. Next, accumulator 135 updates its stored value with the calculated sum.

Figure 2H:
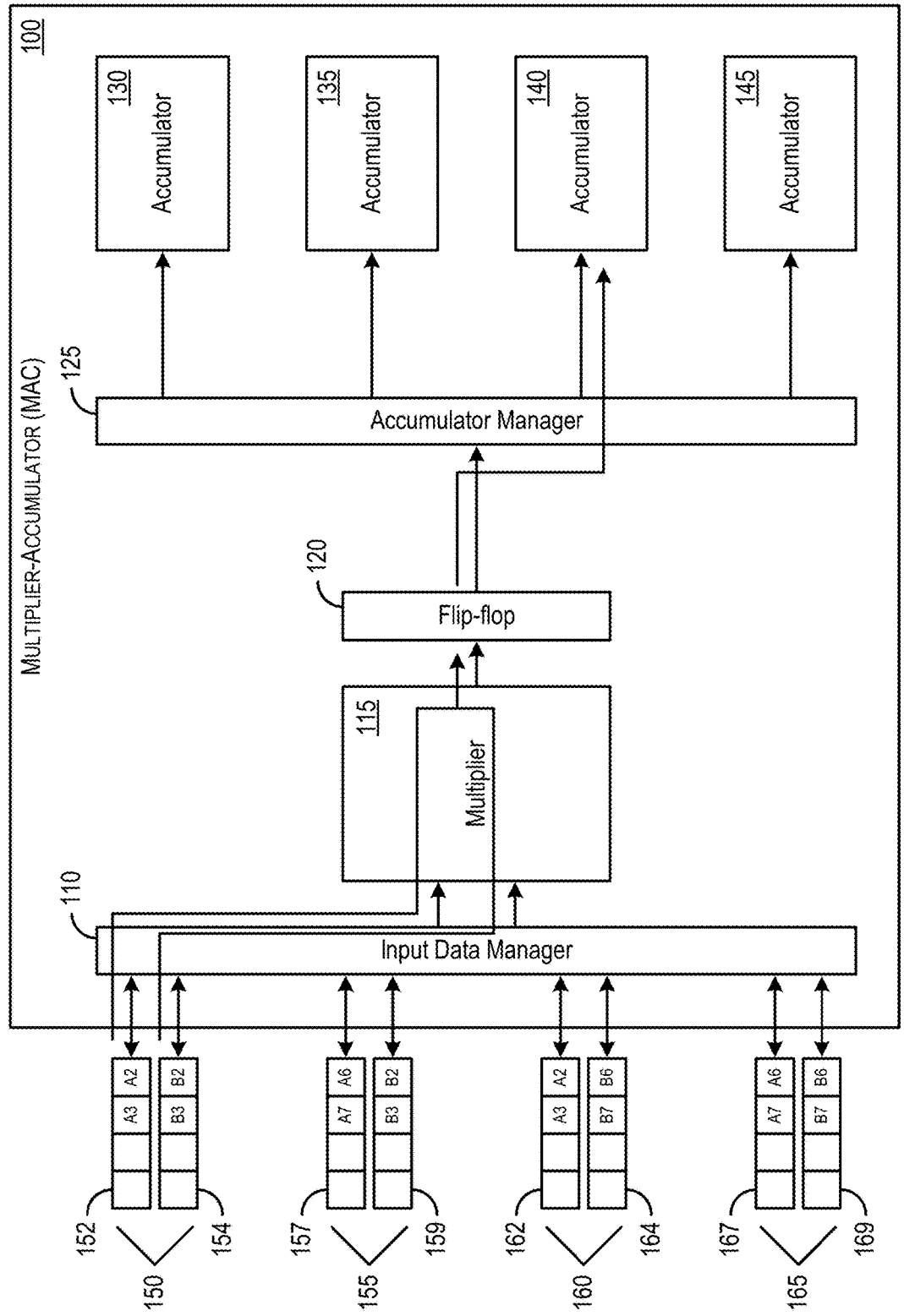

FIG. 2H illustrates the third execution cycle 3 for processing operations 220-295. In this example, input data manager 110 has continued to iterate through pairs of data streams 150-165 (e.g., starting by looking at elements A5 and B5 in pair of data streams 165) to identify a pair of values that are both non-zero. For pairs of data that includes at least one zero value, input data manager 110 removed them from the queue of the respective pair of data stream. Input data manager 110 did not find a pair of non-zero values until it reached elements A2 and B2 in pair of data streams 150. As illustrated in FIG. 2H, when input data manager 110 finds this pair of data, input data manager 110 removes the pair of data from the queue for pair of data stream 150 and sends it to multiplier 115. Then, multiplier 115 performs a multiplication operation on elements A2 and B2 to produce a product. Next, multiplier 115 sends the product to flip-flop 120, as depicted in FIG. 2H. At the end of execution cycle 3, flip-flop 120 stores the product of elements A2 and B2. Also during execution cycle 3, flip-flop 120 sends the product from the multiplication operation in execution cycle 2 to accumulator manager 125. Since the operands for the multiplication operation in execution cycle 2 was from pair of data stream 160, accumulator manager 125 routes the product to accumulator 140, which handles the accumulation of data for pair of data stream 160. Accumulator 140 adds the product to its stored value (zero in this example) to produce a sum. Then, accumulator 140 updates its stored value with the calculated sum.

Figure 2I:
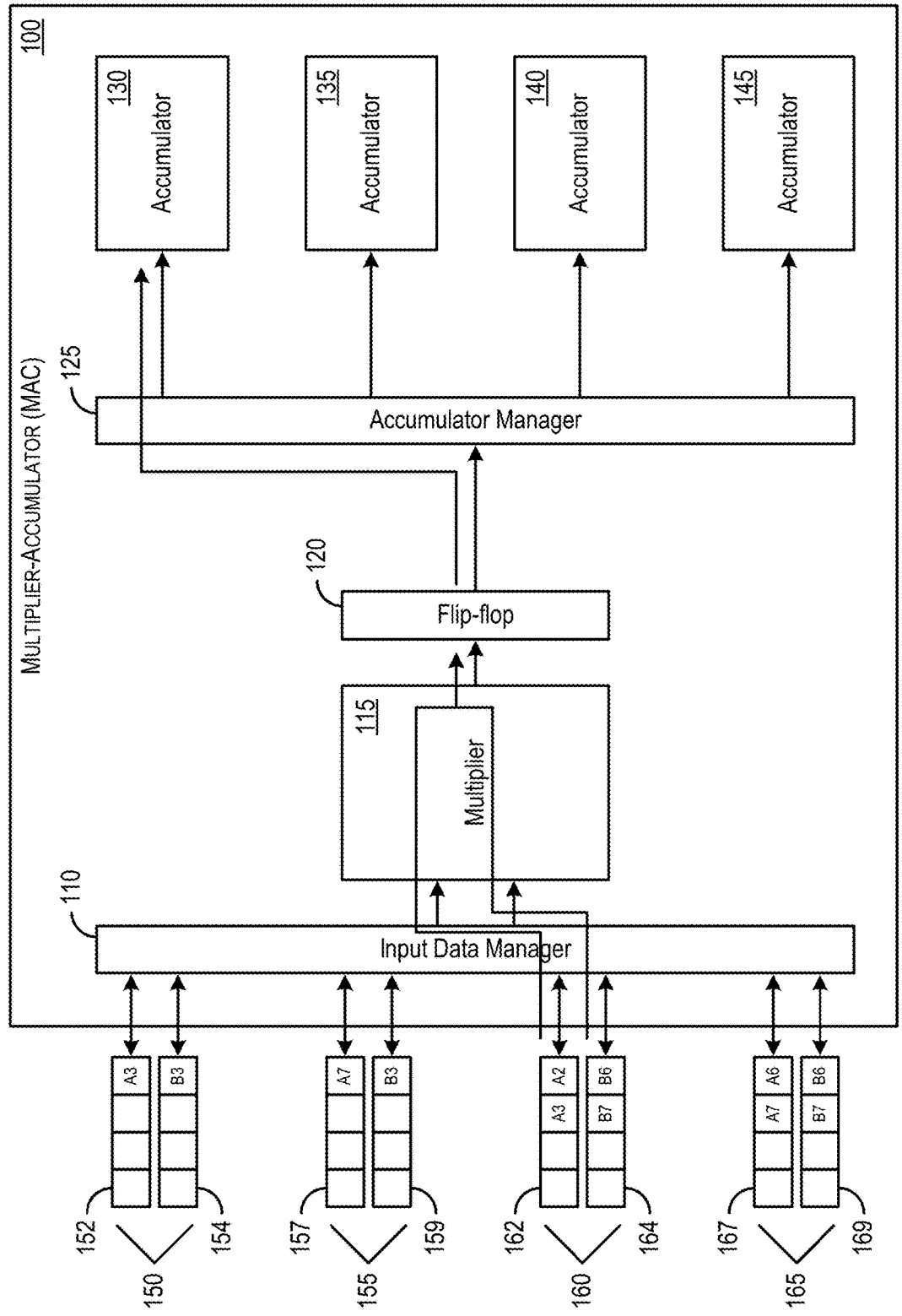

FIG. 2I illustrates the fourth execution cycle 4 for processing operations 220-295. For this example, input data manager 110 has continued to iterate through pairs of data streams 150-165 (e.g., starting by looking at elements A6 and B2 in pair of data streams 155) to identify a pair of values that are both non-zero. For pairs of data that includes at least one zero value, input data manager 110 removed them from the queue of the respective pair of data stream. Input data manager 110 did not find a pair of non-zero values until it reached elements A2 and B6 in pair of data streams 160. As shown in FIG. 2I, once input data manager 110 finds this pair of data, input data manager 110 removes the pair of data from the queue for pair of data stream 160 and sends it to multiplier 115. Multiplier 115 then performs a multiplication operation on elements A2 and B6 to produce a product. Multiplier 115 sends the product to flip-flop 120, as illustrated in FIG. 2I. At the end of execution cycle 4, flip-flop 120 stores the product of elements A2 and B6. During execution cycle 4, flip-flop 120 also sends the product from the multiplication operation in execution cycle 3 to accumulator manager 125. Because the operands for the multiplication operation in execution cycle 3 was from pair of data stream 150, accumulator manager 125 routes the product to accumulator 130, which handles the accumulation of data for pair of data stream 150. Then, accumulator 130 adds the product to its stored value (zero in this example) to produce a sum. Then, accumulator 130 updates its stored value with the calculated sum.

Figure 2J:
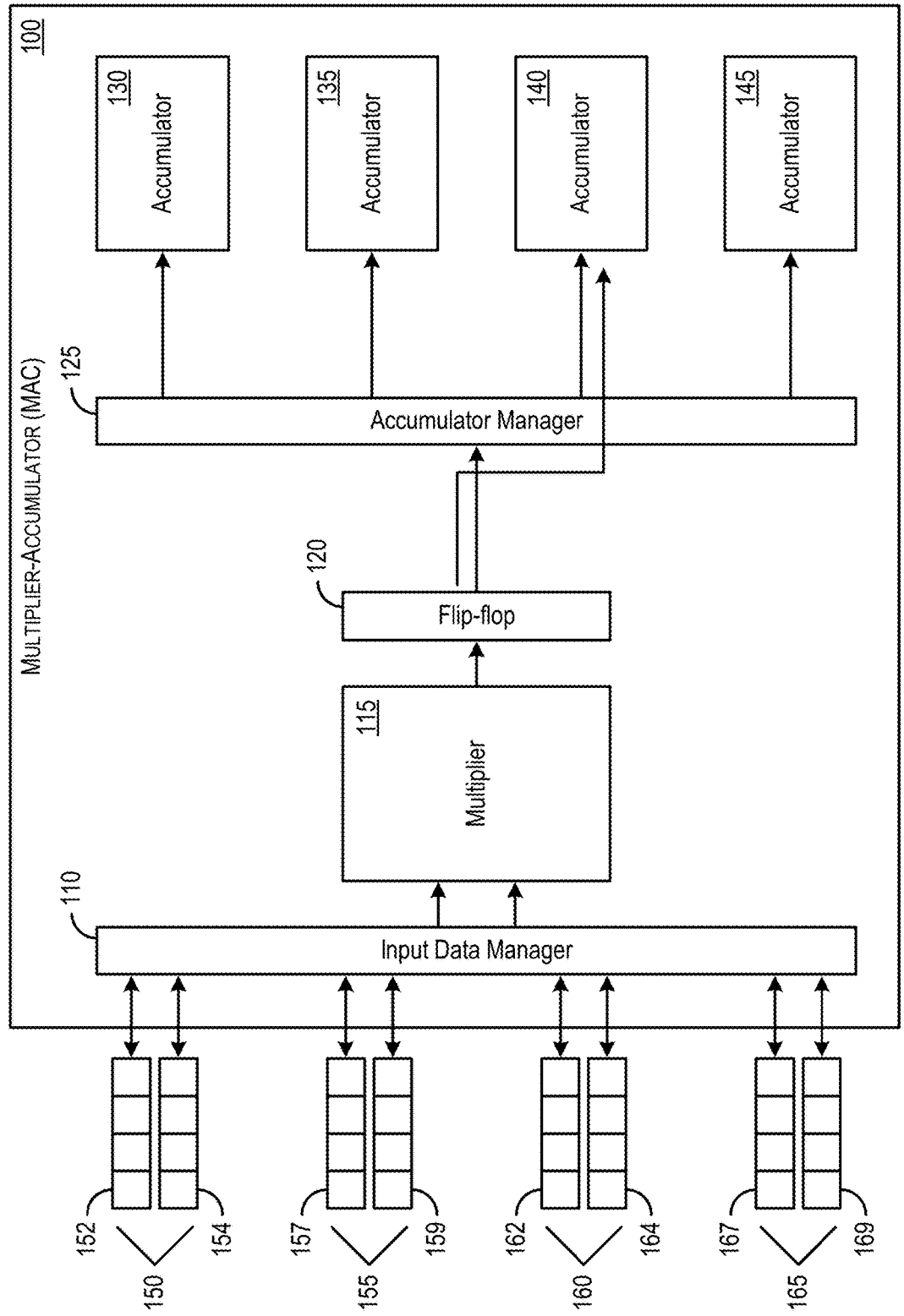

FIG. 2J illustrates the fifth execution cycle 5 for processing operations 220-295. In this example, input data manager 110 has continued to iterate through pairs of data streams 150-165 (e.g., starting by looking at elements A6 and B6 in pair of data streams 165) to identify a pair of values that are both non-zero. For pairs of data that includes at least zero value, input data manager 110 removed them from the queue of the respective pair of data stream. Input data manager 110 iterated through all the remaining pairs of data and did not find a pair of non-zero values. As such, input data manager 110 did not send a pair of data to multiplier 115. Also during execution cycle 5, flip-flop 120 sends the product from the multiplication operation in execution cycle 4 to accumulator manager 125. As the operands for the multiplication operation in execution cycle 4 was from pair of data stream 160, accumulator manager 125 routes the product to accumulator 140. Next, accumulator 130 adds the product to its stored value to produce a sum. Accumulator 130 then updates its stored value with the calculated sum.

FIG. 2K illustrates a table 296 showing the actual operations performed by MAC 105 to process operations 220-295 as well as the execution cycles in which the operations started. As shown, operation 225 started in execution cycle 1, operation 250 started in execution cycle 2, operation 260 started in execution cycle 3, and operation 270 started in execution cycle 4. As each operation takes two cycles to finish, operation 225 finished in execution cycle 2, operation 270 finished in execution cycle 3, operation 260 finished in execution cycle 4, and operation 270 finished in execution cycle 5.

The example described above by reference to FIGS. 2A-2K illustrates a processing technique that scans for non-zero values along both the depth dimension and the spatial dimension. Examining both dimensions allows for increased acceleration of processing. Additionally, FIGS. 2A-2K show how one MAC is used to process a portion of two matrices. In some embodiments, an array of such MACs can be used to process an entire pair of matrices or at least a larger portions of matrices.

FIG. 3 illustrates an example hardware system 300 according to some embodiments. As shown, hardware system 300 includes input queues 305, input queues 310, MAC array 315, and output queues 320. Input queues 305 are configured to store elements of a first matrix A and input queues 310 are configured to store elements of a second matrix B. As illustrated, input queues 305 provides five entries for each row of MAC array 315. Each entry includes 16 cells. Each cell in an entry is for a corresponding MAC in a corresponding row of MACs in MAC array 315. Each cell includes 16 read pointers to serve the 16 columns of MACs in the corresponding row of MACs in MAC array 315. The 16 read pointers from a row of MACs in MAC array 315 move independently from each other to read data from any of the 5 entries. Each cell is configured to store two sets of elements from two spatial positions of a matrix. Referring to FIG. 2A as an example, each cell can store a first set of elements A0-A3 for a first spatial position in matrix 200 and a second set of elements A4-A7 for a second spatial position in matrix 200. Therefore, each cell stores a total of 8 elements.

Input queues 310 have a similar structure. As depicted in FIG. 3, input queues 310 provides five entries for each column of MAC array 315. Each entry includes 16 cells. Each cell in an entry is for a corresponding MAC in a corresponding column of MACs in MAC array 315. Each cell includes 16 read pointers to serve the 16 rows of MACs in the corresponding column of MACs in MAC array 315. The 16 read pointers from a column of MACs in MAC array 315 move independently from each other to read data from any of the 5 entries. Each cell is configured to store two sets of elements from two spatial positions of a matrix. Referring to FIG. 2A as an example, each cell can store a first set of elements B0-B3 for a first spatial position in matrix 205 and a second set of elements B4-B7 for a second spatial position in matrix 205.

As illustrated in FIG. 3, MAC array 315 is a 16×16 array of MACs for a total of 256 MACs. In this example, each MAC in MAC array 315 is implemented using MAC 105. Thus, each MAC in MAC array 315 can accelerate the processing of their respective data in a similar manner as that explained above by reference to FIGS. 2A-2K. Output queues 320 are configured to store the outputs generated by each MAC in MAC array 315. Since each MAC in MAC array 315 is configured to generate four outputs, output queues 320 is configured to store 1024 outputs (256 MACs×4 outputs).

Figure 4:
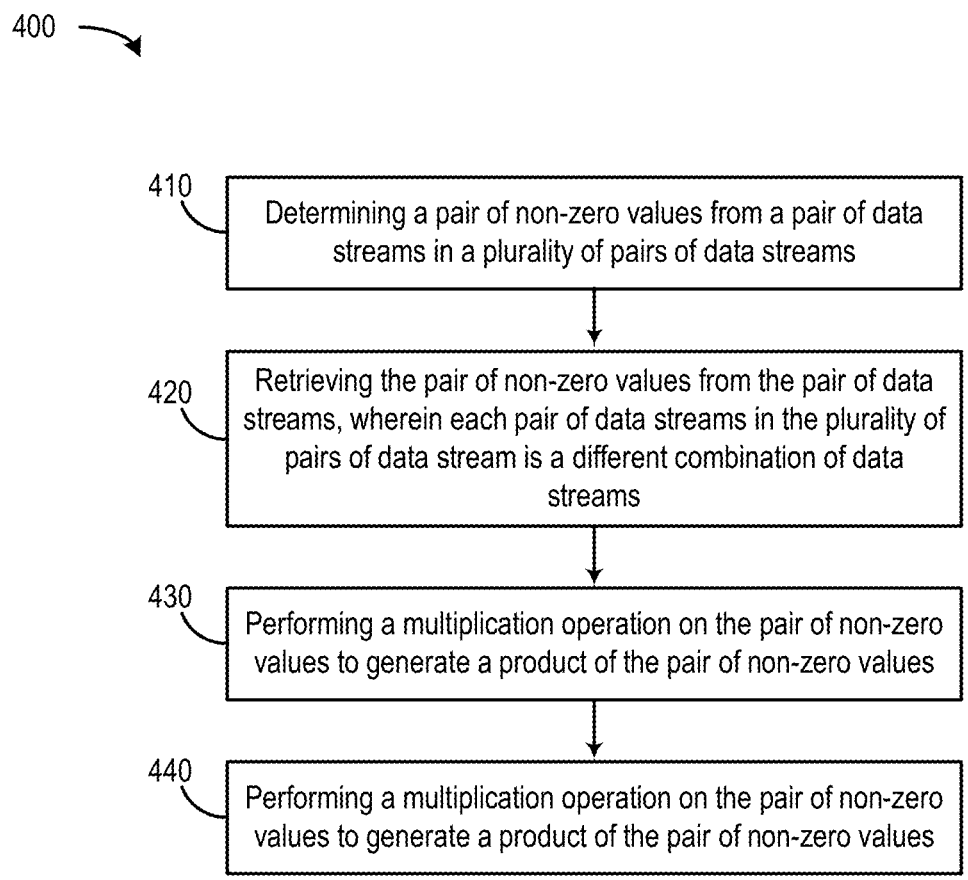
FIG. 4 illustrates a process for accelerating processing based on sparsity according to some embodiments.

FIG. 4 illustrates a process 400 for accelerating processing based on sparsity according to some embodiments. In some embodiments, MAC 105 performs process 400. Process 400 starts by determining, at 410, a pair of non-zero values from a pair of data streams in a plurality of pairs of data streams. Referring to FIGS. 1 and 2E, input data manager 110 determines a pair of data from one of the pair of data streams 150-165 where both values are non-zero. In this example, determines that the pair of data at the beginning of the queue (elements A4 and B0) include two non-zero values.

Next, process 400 retrieves, at 420, the pair of non-zero values from the pair of data streams. Each pair of data streams in the plurality of pairs of data stream is a different combination of data streams. Referring to FIGS. 1 and 2F, once input data manager determines that elements A4 and B0 in pair of data streams 155 is to be processed through MAC 105, input data manager 110 removes the pair of data from the queue for pair of data streams 155 and it sends it to multiplier 115.

Process 400 then performs, at 430, a multiplication operation on the pair of non-zero values to generate a product of the pair of non-zero values. Referring to FIGS. 1 and 2F, multiplier 115 performs a multiplication operation on elements A4 and B0 to produce a product and sends the product to flip-flop 120, which stores the product of elements A4 and B0. Finally, process 400 sends, at 440, the product of the pair of non-zero values to a corresponding accumulator in a plurality of accumulators. The corresponding accumulator is configured to store a value, add the product of the pair of non-zero values to the value to produce a sum, and update the value with the sum. Referring to FIGS. 1 and 2G as an example, flip-flop 120 sends the product from the multiplication operation on elements A4 and B0 to accumulator manager 125. The operands for the multiplication operation was from pair of data stream 155. Therefore, accumulator manager 125 routes the product to accumulator 135, which handles the accumulation of data for pair of data stream 155. Accumulator 135 adds the product to its stored value to produce a sum and updates its stored value with the calculated sum.

Figure 5:
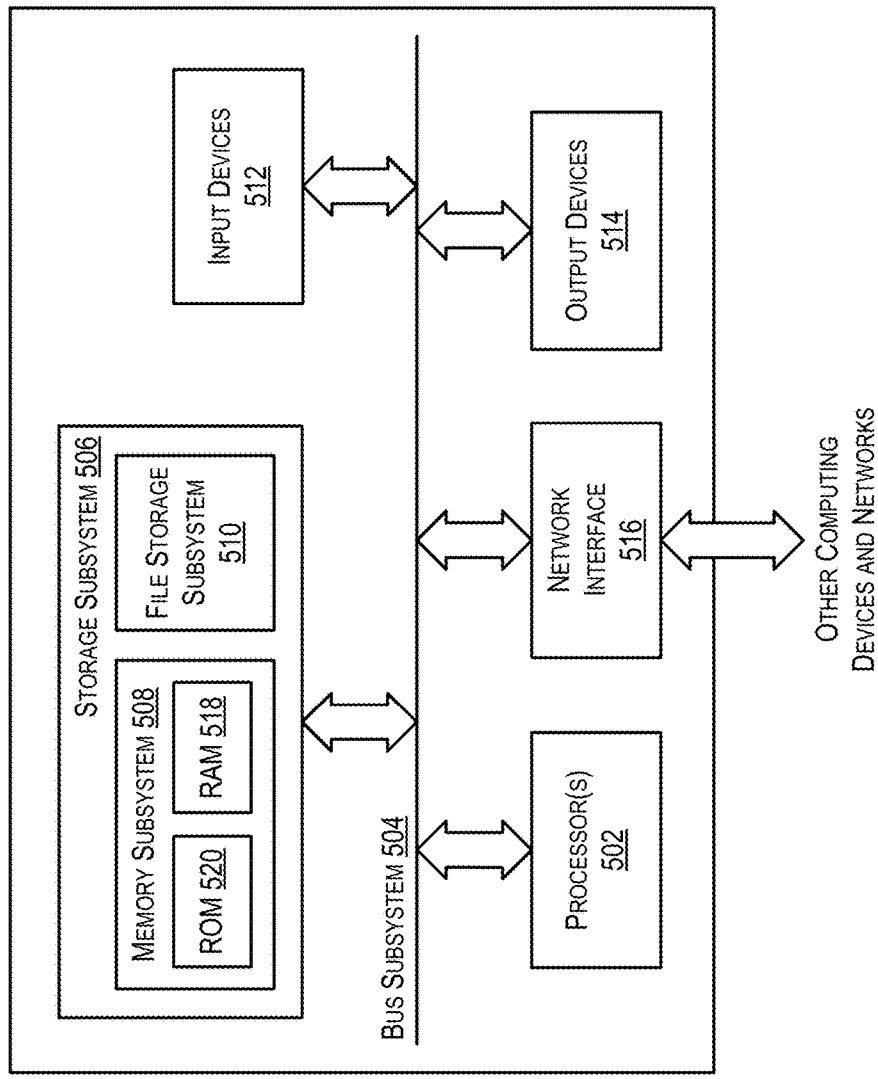
FIG. 5 depicts a simplified block diagram of an example computer system according to some embodiments.

The techniques describe above may be implemented in a wide range of computer systems configured to process neural networks. FIG. 5 depicts a simplified block diagram of an example computer system 500, which can be used to implement the techniques described in the foregoing disclosure. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Figure 6:
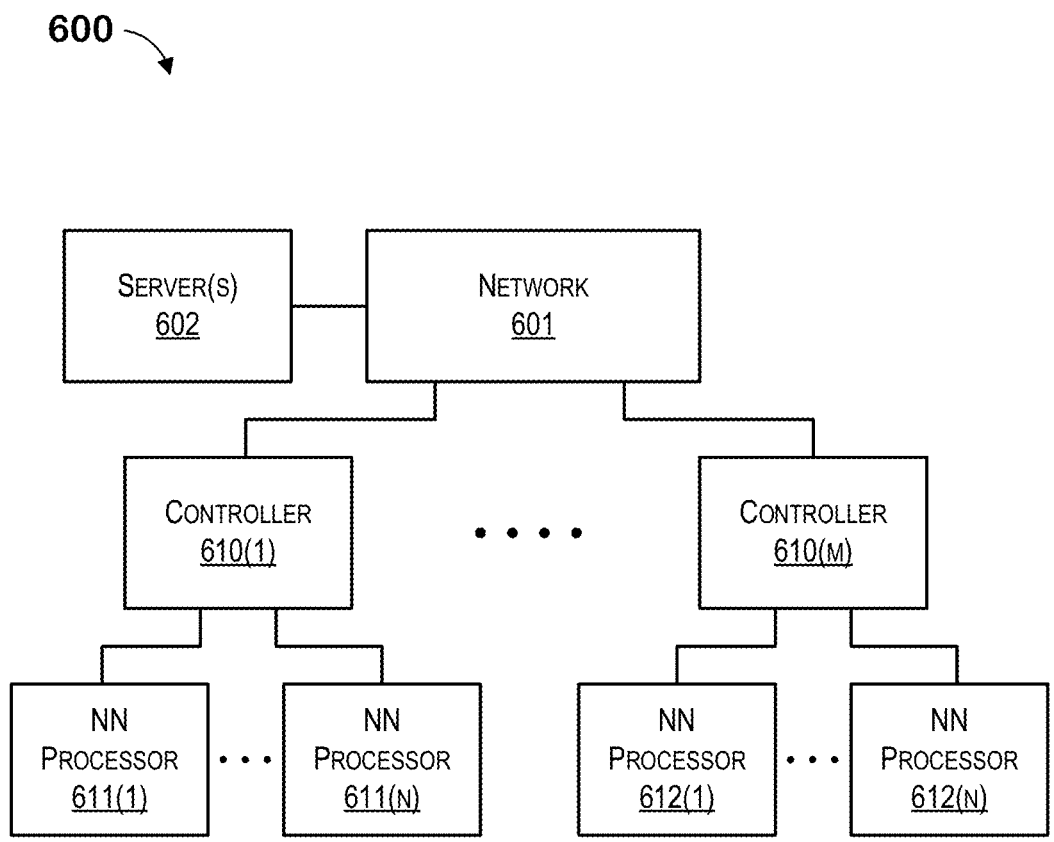
FIG. 6 illustrates a neural network processing system according to some embodiments.

FIG. 6 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 602, which may comprise architectures illustrated in FIG. 5 above, may be coupled to a plurality of controllers 610(1)-610(M) over a communication network 601 (e.g. switches, routers, etc.). Controllers 610(1)-610(M) may also comprise architectures illustrated in FIG. 5 above. Each controller 610(1)-610(M) may be coupled to one or more NN processors, such as processors 611(1)-611(N) and 612(1)-612(N), for example. NN processors 611(1)-611(N) and 612(1)-612(N) may include a variety of configurations of functional processing blocks and memory optimized for neural network processing, such as training or inference. The NN processors are optimized for neural network computations. In some embodiments, each NN processor can be implemented by hardware system 100 or hardware system 300. Server 602 may configure controllers 610 with NN models as well as input data to the models, which may be loaded and executed by NN processors 611(1)-611(N) and 612(1)-612(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for accelerating processing based on sparsity. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising an input manager configured to determine a pair of non-zero values from a pair of data streams in a plurality of pairs of data streams and retrieve the pair of non-zero values from the pair of data streams, wherein each pair of data streams in the plurality of pairs of data stream is a different combination of data streams; a multiplier configured to perform a multiplication operation on the pair of non-zero values and generate a product of the pair of non-zero values; an accumulator manager configured to receive the product of the pair of non-zero values from the multiplier; and a plurality of accumulators, each accumulator in the plurality of accumulators configured to store a particular value, receive from the accumulator manager a particular product of a pair of non-zero values from a corresponding pair of data streams in the plurality of pairs of data streams, add the particular product of the pair of non-zero values to the value to produce a particular sum, and update the particular value with the particular sum. The accumulator manager is further configured send the product of the pair of non-zero values to the corresponding accumulator in the plurality of accumulators.

In one embodiment, the input manager determines the pair of non-zero values from the pair of data streams and retrieves the pair of non-zero values from the pair of data streams during a first execution cycle. The multiplier performs the multiplication operation on the pair of non-zero values during the first execution cycle.

In one embodiment, an accumulator in the plurality of accumulators that receives the product of the pair of non-zero values performs the addition of the product of the pair of non-zero values to a value to produce a sum and the update of the value with the sum during a second execution cycle.

In one embodiment, the pair of non-zero values is a first pair of non-zero values, the pair of data streams in the plurality of pairs of data streams is a first pair of data streams, the multiplication operation is a first multiplication operation, and the product is a first product. The input manager is further configured to determine a second pair of non-zero values from a second pair of data streams in the plurality of pairs of data streams and retrieve the second pair of non-zero values from the second pair of data streams. The multiplier is further configured to perform a second multiplication operation on the second pair of non-zero values and generate a second product of the second pair of non-zero values.

In one embodiment, the input manager determines the second pair of non-zero values from the second pair of data streams and retrieves the second pair of non-zero values from the second pair of data streams during the second execution cycle. The multiplier performs the multiplication operation on the pair of non-zero values during the second execution cycle.

In one embodiment, the accumulator is a first accumulator, the value is a first value, and the sum is a first sum. A second accumulator in the plurality of accumulators that receives the second product of the second pair of non-zero values performs the addition of the second product of the second pair of non-zero values to a second value to produce a second sum and the update of the second value with the second sum during a third execution cycle.

In one embodiment, the present disclosure further comprises a plurality of queues. A first queue in the plurality of queues is configured to store a first set of data from a first data stream in the pair of data streams and a second queue in the plurality of queues is configured to store a second set of data from a second data stream in the pair of data streams. The input manager retrieves the pair of non-zero values from the pair of data streams by retrieving the pair of non-zero values from the first and second queues.

In one embodiment, the first set of data comprises elements in a first three-dimensional (3D) matrix along a first depth axis of a first spatial position in the first 3D matrix and the second set of data comprises elements in a second 3D matrix along a second depth axis of a second spatial position in the second 3D matrix.

In one embodiment, each pair of data streams provides data for performing a matrix multiplication operation between a first matrix and a second matrix based on an all-to-all dot product multiplication between elements in the first matrix and elements in the second matrix.

In one embodiment, a first data stream in a first pair of data streams in the plurality of pairs of data streams and a second data stream in a second pair of data streams in the plurality of pairs of data streams use a same source of data.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
an input manager configured to iterate through each pair of data streams in a plurality of pairs of data streams until a pair of non-zero values are identified in a particular pair of data streams in the plurality of pairs of data streams and retrieve the pair of non-zero values from the particular pair of data streams, wherein each pair of data streams in the plurality of pairs of data stream is a different combination of data streams;
a multiplier configured to perform a multiplication operation on the pair of non-zero values and generate a product of the pair of non-zero values;
an accumulator manager configured to receive the product of the pair of non-zero values from the multiplier; and
a plurality of accumulators, each accumulator in the plurality of accumulators configured to store a particular value, receive from the accumulator manager a particular product of a pair of non-zero values from a corresponding pair of data streams in the plurality of pairs of data streams, add the particular product of the pair of non-zero values to the particular value to produce a particular sum, and update the particular value with the particular sum,
wherein the accumulator manager is further configured to send the product of the pair of non-zero values to an accumulator in the plurality of accumulators that corresponds to the particular pair of data streams.

2. The system of claim 1, wherein the input manager determines the pair of non-zero values from the pair of data streams and retrieves the pair of non-zero values from the pair of data streams during a first execution cycle, wherein the multiplier performs the multiplication operation on the pair of non-zero values during the first execution cycle.

3. The system of claim 2, wherein the accumulator in the plurality of accumulators that receives the product of the pair of non-zero values performs the addition of the product of the pair of non-zero values to a value to produce a sum and the update of the value with the sum during a second execution cycle.

4. The system of claim 3, wherein the pair of non-zero values is a first pair of non-zero values, wherein the pair of data streams in the plurality of pairs of data streams is a first pair of data streams, wherein the multiplication operation is a first multiplication operation, wherein the product is a first product, wherein the input manager is further configured to determine a second pair of non-zero values from a second pair of data streams in the plurality of pairs of data streams and retrieve the second pair of non-zero values from the second pair of data streams, wherein the multiplier is further configured to perform a second multiplication operation on the second pair of non-zero values and generate a second product of the second pair of non-zero values.

5. The system of claim 4, wherein the input manager determines the second pair of non-zero values from the second pair of data streams and retrieves the second pair of non-zero values from the second pair of data streams during the second execution cycle, wherein the multiplier performs the multiplication operation on the pair of non-zero values during the second execution cycle.

6. The system of claim 5, wherein the accumulator is a first accumulator, wherein the value is a first value, wherein the sum is a first sum, wherein a second accumulator in the plurality of accumulators that receives the second product of the second pair of non-zero values performs the addition of the second product of the second pair of non-zero values to a second value to produce a second sum and the update of the second value with the second sum during a third execution cycle.

7. The system of claim 1 further comprising a plurality of queues, wherein a first queue in the plurality of queues is configured to store a first set of data from a first data stream in the pair of data streams and a second queue in the plurality of queues is configured to store a second set of data from a second data stream in the pair of data streams, wherein the input manager retrieves the pair of non-zero values from the pair of data streams by retrieving the pair of non-zero values from the first and second queues.

8. The system of claim 7, wherein the first set of data comprises elements in a first three-dimensional (3D) matrix along a first depth axis of a first spatial position in the first 3D matrix and the second set of data comprises elements in a second 3D matrix along a second depth axis of a second spatial position in the second 3D matrix.

9. The system of claim 1, each pair of data streams provides data for performing a matrix multiplication operation between a first matrix and a second matrix based on an all-to-all dot product multiplication between elements in the first matrix and elements in the second matrix.

10. The system of claim 1, wherein a first data stream in a first pair of data streams in the plurality of pairs of data streams and a second data stream in a second pair of data streams in the plurality of pairs of data streams use a same source of data.

11. A circuit comprising:
a first circuit configured to iterate through each pair of data streams in a plurality of pairs of data streams until a pair of non-zero values are identified in a particular pair of data streams in the plurality of pairs of data streams and retrieve the pair of non-zero values from the particular pair of data streams, wherein each pair of data streams in the plurality of pairs of data stream is a different combination of data streams;
a second circuit configured to perform a multiplication operation on the pair of non-zero values and generate a product of the pair of non-zero values;
a third circuit configured to receive the product of the pair of non-zero values from the second circuit; and
a plurality of circuits, each circuit in the plurality of circuits configured to store a particular value, receive from the third circuit a particular product of a pair of non-zero values from a corresponding pair of data streams in the plurality of pairs of data streams, add the particular product of the pair of non-zero values to the particular value to produce a particular sum, and update the particular value with the particular sum,
wherein the third circuit is further configured to send the product of the pair of non-zero values to a circuit in the plurality of circuits that corresponds to the particular pair of data streams.

12. The circuit of claim 11, wherein the first circuit determines the pair of non-zero values from the pair of data streams and retrieves the pair of non-zero values from the pair of data streams during a first execution cycle, wherein the second circuit performs the multiplication operation on the pair of non-zero values during the first execution cycle.

13. The circuit of claim 12, wherein the circuit in the plurality of circuits that receives the product of the pair of non-zero values performs the addition of the product of the pair of non-zero values to a value to produce a sum and the update of the value with the sum during a second execution cycle.

14. The circuit of claim 13, wherein the pair of non-zero values is a first pair of non-zero values, wherein the pair of data streams in the plurality of pairs of data streams is a first pair of data streams, wherein the multiplication operation is a first multiplication operation, wherein the product is a first product, wherein the first circuit is further configured to determine a second pair of non-zero values from a second pair of data streams in the plurality of pairs of data streams and retrieve the second pair of non-zero values from the second pair of data streams, wherein the second circuit is further configured to perform a second multiplication operation on the second pair of non-zero values and generate a second product of the second pair of non-zero values.

15. The circuit of claim 14, wherein the first circuit determines the second pair of non-zero values from the second pair of data streams and retrieves the second pair of non-zero values from the second pair of data streams during the second execution cycle, wherein the second circuit performs the multiplication operation on the pair of non-zero values during the second execution cycle.

16. The circuit of claim 15, wherein the circuit is a first circuit, wherein the value is a first value, wherein the sum is a first sum, wherein a second circuit in the plurality of circuits that receives the second product of the second pair of non-zero values performs the addition of the second product of the second pair of non-zero values to a second value to produce a second sum and the update of the second value with the second sum during a third execution cycle.

17. A method comprising:
iterating through each pair of data streams in a plurality of pairs of data streams until a pair of non-zero values are identified in a particular pair of data streams in the plurality of pairs of data streams;
retrieving the pair of non-zero values from the particular pair of data streams, wherein each pair of data streams in the plurality of pairs of data stream is a different combination of data streams;
performing a multiplication operation on the pair of non-zero values to generate a product of the pair of non-zero values; and
sending the product of the pair of non-zero values to an accumulator in a plurality of accumulators that corresponds to the particular pair of data streams, wherein the accumulator is configured to store a value, add the product of the pair of non-zero values to the value to produce a sum, and update the value with the sum.

18. The method of claim 17 further comprising:
storing a first set of data from a first data stream in the pair of data streams in a first queue in a plurality of queues is configured to store; and
storing a second set of data from a second data stream in the pair of data streams in a second queue in the plurality of queues,
wherein retrieving the pair of non-zero values from the pair of data streams comprises retrieving the pair of non-zero values from the first and second queues storing the pair of non-zero values.

19. The method of claim 18, wherein the first set of data comprises elements in a first three-dimensional (3D) matrix along a first depth axis of a first spatial position in the first 3D matrix and the second set of data comprises elements in a second 3D matrix along a second depth axis of a second spatial position in the second 3D matrix.

20. The method of claim 17, each pair of data streams provides data for performing a matrix multiplication operation between a first matrix and a second matrix based on an all-to-all product multiplication between elements in the first matrix and elements in the second matrix.

\* \* \* \* \*